United States Patent [19]
Szeverenyi et al.

[11] 3,836,882
[45] Sept. 17, 1974

[54] TEMPERATURE COMPENSATED FLUID SENSOR DEVICE

[75] Inventors: Nikolaus A. Szeverenyi; David F. Thompson, both of Warren, Pa.

[73] Assignee: GTE Sylvania Incorporated, Stamford, Conn.

[22] Filed: Aug. 16, 1973

[21] Appl. No.: 388,940

[52] U.S. Cl. ............... 337/102, 337/113, 337/377, 337/381, 340/244 R
[51] Int. Cl. .................... H01h 61/02, H01h 37/04
[58] Field of Search ......... 340/244 R; 337/102, 103, 337/105, 112, 113, 377, 380, 381, 398

[56] References Cited
UNITED STATES PATENTS

| | | | |
|---|---|---|---|
| 2,783,341 | 2/1957 | Wisman | 340/244 R X |
| 3,171,934 | 3/1965 | Brennan et al. | 340/244 R UX |
| 3,335,243 | 8/1967 | Canaday | 340/244 R X |
| 3,713,067 | 1/1973 | Gressenich et al. | 337/112 |

*Primary Examiner*—A. T. Grimley
*Attorney, Agent, or Firm*—Norman J. O'Malley; Donald R. Castle; William H. McNeill

[57] ABSTRACT

There is described an improved sensor device for detecting the presence or absence of fluid. The device comprises a housing member defining a chamber, a tip member adapted for being exposed to a fluid and secured to the housing, a heat conductive member within the chamber, a heater means within the chamber in conductive relationship to both the tip member and the heat conductive member, and first and second heat responsive means. The improvement comprises providing the tip member with a first portion of a relatively thermally conductive material and a second portion of a relatively thermally insulative material.

8 Claims, 4 Drawing Figures

3,836,882

TEMPERATURE COMPENSATED FLUID SENSOR DEVICE

CROSS-REFERENCE TO RELATED APPLICATION

A previously filed patent application U.S. Ser. No. 236,148, now U.S. Pat. No. 3,772,673, discloses and claims a sensing device and is assigned to the same assignee as the present invention. The present application comprises an improvement to this device.

BACKGROUND OF THE INVENTION

This invention relates to fluid sensing apparatus and more particularly to an apparatus for providing an indication when said fluid approaches a predetermined level.

The tip member for the sensing device described in the previously mentioned application Ser. No. 236,148 is disclosed as having a lesser heat transfer capability than a heat conductive member positioned within the device. This tip is adapted for being exposed to a fluid and for preventing entrance of the fluid into a defined chamber within the device housing. While not limited thereto, one embodiment of this tip comprises a relatively thin formed metallic sheet which is secured to and protrudes from the housing member. Although this particular embodiment performs well, it has been found that the sensing sensitivity of the device can be improved by a tip member utilizing at least two portions of different material wherein one portion is of a material possessing good thermal conductivity properties as opposed to a tip member constructed of a unitary material possessing relatively low thermal conductivity properties.

It is believed, therefore, that a sensing device of the nature described which includes an improved tip member of a rugged design and with satisfactory thermal conductive characteristics would constitute an advancement in the art.

OBJECTS AND SUMMARY OF THE INVENTION

It is therefore a primary object of this invention to provide an improved fluid sensing device.

It is a further object of this invention to provide the described sensing device which has a rugged tip member thereon.

It is still a further object of this invention to provide an improved sensing device in which the tip member provides satisfactory thermal conductive properties.

In accordance with one aspect of this invention, there is provided an improved sensing device for detecting the presence or absence of fluid. This device comprises a housing member defining a chamber, a tip member adapted for being exposed to a fluid and secured to said housing to form a closure for said chamber, a heat conductive member within the chamber, heater means within the chamber, and first and second heat responsive means. The improvement to the device comprises providing the tip member with a first portion of a relatively thermally conductive material and a second portion of a relatively thermally insulative material.

DETAILED DESCRIPTION OF THE PREFERRED EMBODIMENTS

For a better understanding of the present invention, together with other and further objects, advantages and capabilities thereof, reference is made to the following disclosure and appended claims in connection with accompanying drawings.

Figure 1:
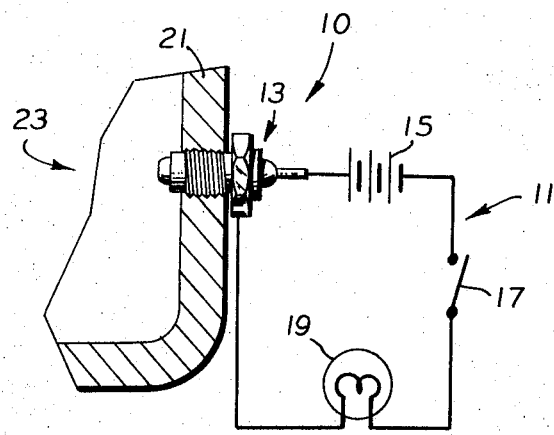
FIG. 1 is a plan view of an embodiment of the sensor device and apparatus disclosed in application Ser. No. 236,148.

In FIG. 1, one embodiment of a fluid detecting apparatus 10 is illustrated and shown to comprise an electrical circuit 11 and a sensor device 13. Circuit 11 comprises a potential source illustrated as battery 15, switching means 17 for opening and closing circuit 11, and a current indicating means illustrated as bulb 19. Sensor device 13 is electrically connected to circuit 11 and is shown to be positioned within wall 21 of a fluid holding container 23.

Figure 2:
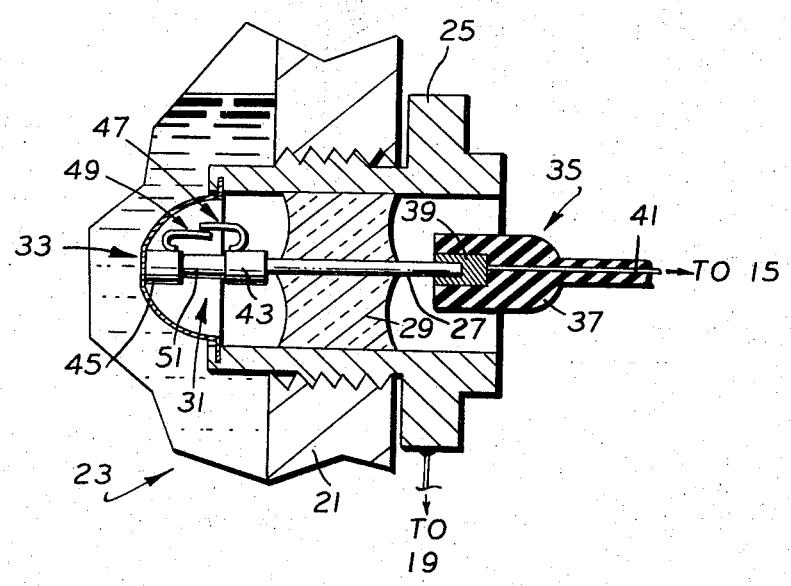
FIG. 2 is an enlarged view of the device of FIG. 1.

In FIG. 2 can be seen a more detailed view of sensor 13 which is shown to comprise a housing 25, a heat conductive member 27, which is positioned within housing 25 and insulated therefrom by insulating material 29, a heater means 31, and a tip member 33. As fully described in U.S. Ser. No. 236,148, it is preferred that housing 25, heat conductive member 27, and tip member 33 be of electrically conductive material. Member 27 is connected to circuit 11 via plug 35 illustrated as a body of insulative material 29 about a metallic socket 39 which in turn is connected to conducting wire 41. Plug 35 is but one means possible for providing this interconnection and is in no way meant as a sole method to which the invention is limited. Additional connecting means, including an alligator clip or even a single wire soldered to member 27 are possible. In the event that the atmosphere surrounding container 23 is not favorable for exposed electrical connections, a plug having an insulating cap to encompass the external portion of either member 27 or housing 25 is preferred.

The tip member 33 of this device is sealed to housing 25 to thereby encapsulate heater means 31 therein and is adapted for being subjected to the fluid within container 23. It is also a primary purpose of tip member 33 to prevent fluid from entering the sensor device and particularly that portion occupied by heater means 31. A suitable material for this tip member is sold under the trade name "Rodar" and manufactured by the W. B. Driver Co. of Newark, New Jersey, a subsidiary of the assignee of the proposed present invention. "Rodar" consists essentially of about 29 percent by weight nickel, 17 percent by weight cobalt, and the remainder iron. This material is a suitable electrical conductor and possesses the additional property of relatively low thermal conductivity. As illustrated in cross-section in FIG. 2, tip member 33 is relatively thin in nature and protrudes beyond the confines of housing 25. By forming this protrusion, tip member 33 is easily adapted for being exposed to the fluid within container 23.

Heater means 31, illustrated as an electrical resistive element, comprises first and second spaced apart portions 43 and 45 respectively. First spaced apart portion is joined to heat conductive member 27 while second spaced apart portion 45 is secured to an interior surface of tip member 33. First and second spaced apart portions 43 and 45 are preferably of electrically conductive material and have first and second heat responsive means 47 and 49 affixed respectively thereto. The material preferred for portions 43 and 45 is a nickel-silver metallic alloy, although any of the well-known metals or metal alloys having good electrical conductive properties can be utilized.

Heat responsive means 47 and 49, illustrated as a pair of bimetallic members, possess similar electrical conducting properties as well as substantially similar characteristics of thermal deflection. Means 47 and 49 are positioned as illustrated in an opposingly aligned manner and are adapted for engaging when the temperature difference between first and second spaced apart portions 43 and 45 exceeds a predetermined level. This temperature difference results from a difference of rates of heat transfer of heat conductive member 27 and tip member 33.

In operation, switching means 17 is closed thereby providing electrical current to circuit 11 and sensor 13. A typical direction of current flow from battery 15 is through heat conductive member 27, first spaced apart portion 43 of resistive element 31, the resistive material 51 of element 31, second spaced apart portion 45, tip member 33, housing member 25, and thereafter back to circuit 11 where it passes through bulb 19. Because this current must pass through resistive material 51, it is not sufficient to activate bulb 19. Assuring that the bulb will not light is easily accomplished by proper selection of corresponding elements in the sensor and circuit. The current through the resistive material of heater means 31 causes the heater means to become warm as is typical in almost all electrical resistors. This heat dissipates out through spaced apart portions 43 and 45 of heater means 31. The heat dissipated through portion 43 is heat sinked further through heat conductive member 27, insulative material 29, housing 25, and eventually into container wall 21. The heat dissipated through portion 45 is heat sinked primarily through tip member 33 and then to the fluid within container 23. Provided the above-described opposing paths of heat escape permit substantially equal rates of heat transfer, first and second heat responsive means 47 and 49 will remain in a non-engaged position as illustrated in FIG. 2. However, when a difference in this rate of heat transfer exists such as would be caused by the absence of fluid about tip member 33, first and second heat responsive means 47 and 49 will become mutually engaged. In doing so, electrical current is permitted to bypass the resistive material of heater means 31, and therefore, be at sufficient strength to actuate bulb 19. This, in turn, indicates to an operator that the fluid level of container 23 is below tip member 33.

The sensor device as illustrated is unique in another feature in that it provides a means whereby bulb 19 is sequentially actuated to more readily indicate to the operator the low fluid level. This sequential actuation is achieved when the electrical current by-passing the resistive material 51 of heater means 31 passes through engaged heat responsive means 47 and 49 for a sufficient period in order to allow the resistive material to cool. This cooling lowers the temperature difference between spaced apart portions 43 and 45 to thereby reduce the corresponding temperatures in responsive means 47 and 49, causing them to disengage. The current thereafter must pass through the resistive material once again until this temperature difference is again attained, causing means 47 and 49 to engage.

Figure 3:
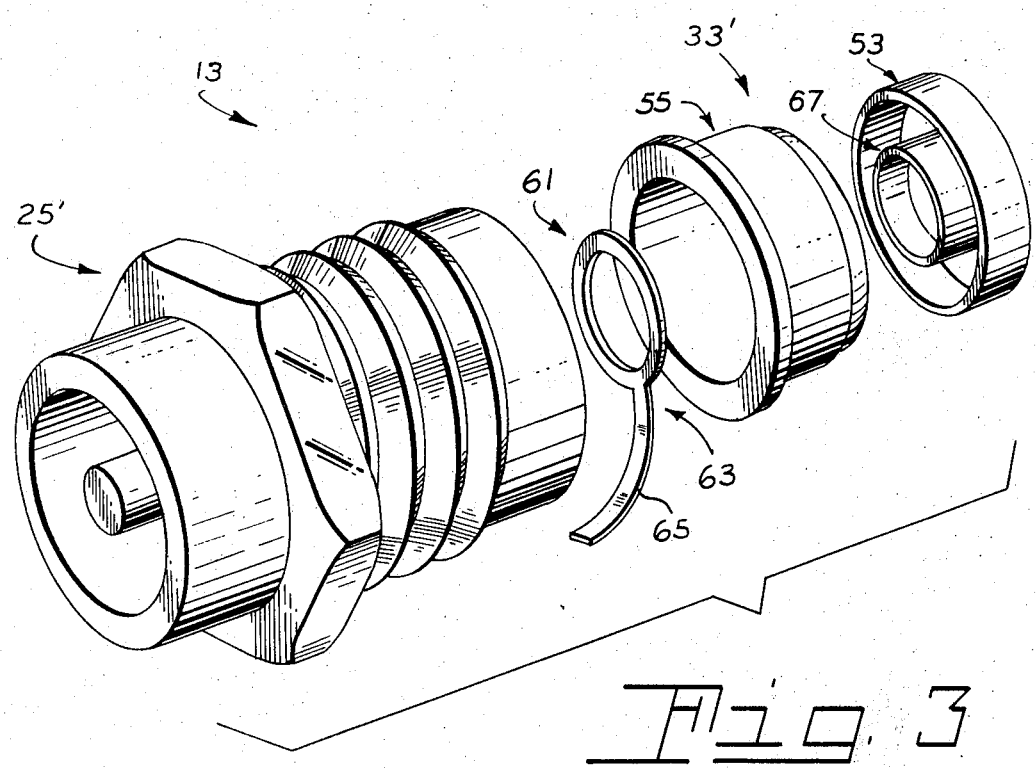
FIG. 3 is an exploded view of one embodiment of the present invention.
Figure 4:
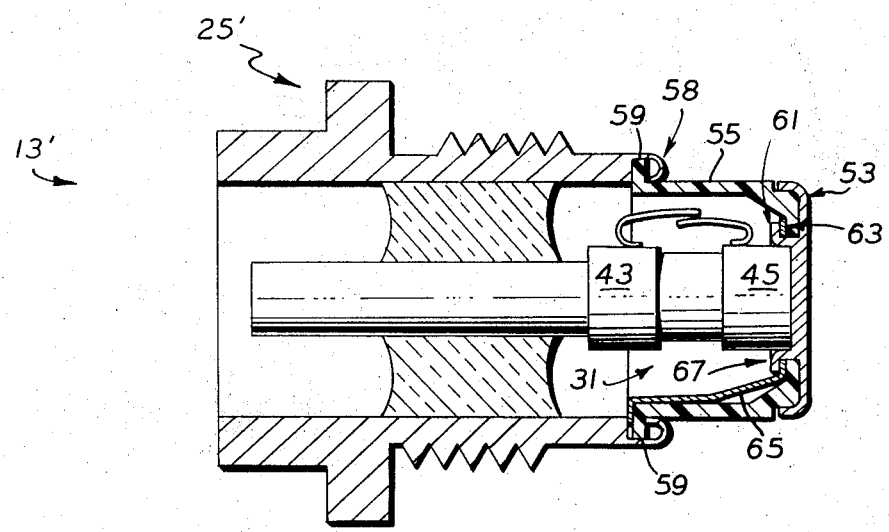
FIG. 4 is a side elevational view of the embodiment of FIG. 1.

In accordance with the present invention, therefore, there is illustrated in FIGS. 3 and 4 an improved sensor device utilizing an improved tip member. With particular reference to FIG. 3, sensor device 13' is illustrated as comprising a housing member 25' which is substantially similar to that of housing member 25 of the described sensor device. Housing 25' does include a modification thereto as will be explained with the description of FIG. 4. Improved sensor device 13' also includes a tip assembly 33' which is shown to comprise a first portion 53 of a relatively thermally conductive material that is a material having a coefficient of heat transfer $(k)$ greater than about 20 BTU/(hr)(ft$^2$)(°F per ft) at 32°F and a second portion 55 of a relatively thermally insulative material that is a material having a heat transfer coefficient $(k)$ less than about 10 BTU/(hr)(ft$^2$)(°F per ft) at 32°F. With reference to both FIGS. 3 and 4, second portion of substantially thermally insulative material 55 is affixed to housing 25' in the manner indicated. Although the method shown is by crimping a protruding cylindrical portion 58 of the end of housing 25' about an upstanding end 59 of second portion 55, it is understood that several methods are possible for affixing second portion 55 to housing 25'. A suitable cement compound could be utilized to bond these members. First portion 53 of tip member 33' is affixed to second portion 55 in the manner indicated and is in heat conductive relationship to second spaced apart portion 45 of heater means 31. A preferred material for first portion 53 is copper or any of the other good thermally conductive materials, while that material preferred for second portion 55 can be chosen from any of the durable corrosion resistive plastics.

When utilizing plastic as the material for second portion 55 it can be clearly seen that current flow from second spaced apart portion 45 to housing 25' is impossible. To complete a circuit between these members, an electrically conductive member 61 is utilized. Conductive member 61 comprises a ringed body portion 63 having an elongated tail portion 65 affixed thereto. The preferred material for conductive member 61 is "Rodar," although any of the well-known electrically conductive materials can be used. To assemble tip member 33' second portion 55 is positioned within first portion 53 in the manner as indicated in FIG. 4. Ringed portion 63 of the electrically conductive member 61 is then placed over upstanding cylindrical portion 67 of first portion 53, after which cylindrical portion 67 is crimped or similarly deformed over both ringed portion 63 as well as the defined end of second portion 55. The assembled tip member is then aligned with cylindrical end 58 of housing 25 and the previously described crimping operation in which upstanding end 59 is secured is accomplished. Just prior to this crimping operation, however, a predetermined portion of elongated end 65 of contact member 61 is positioned and consequently secured between end 59 and housing 25' as indicated in FIG. 4. Thus it can be seen that a path for electrical current from first portion 53 of tip member 33' to housing 25' is provided. It can also be seen that a tip member of a rugged nature has been provided which is highly unsusceptible to damage described during periods of severe mechanical shock.

Because the improved tip assembly includes a portion of a relatively thermally insulative material it has become necessary to utilize a relatively good thermally conductive material for first portion 53. As described previously, it is preferred that this material be of copper, silver or any of the other good thermally conductive materials. Utilization of such materials has thus resulted in an assembly which is better adapted for indicating the properties of the fluid media about the tip of the sensing device.

Thus, there has been provided an improved sensing device for detecting presence or absence of fluid about its tip member.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a sensor device having a housing member defining a chamber, a tip member adapted for being exposed to a fluid, said tip member secured to said housing and forming a closure for said chamber and to prevent fluid entrance into said chamber, a heat conductive member within said chamber having a greater heat transfer capability than said tip member, heater means within said chamber having first and second spaced apart portions, said first portion in heat conductive relationship to said heat conductive member within said chamber, said second portion in heat conductive relationship to said tip member, and first and second heat responsive means having substantially similar characteristics of thermal deflection, said first and second heat responsive means in heat conducting relationship to said first and second spaced apart portions respectively and each having a free end adapted for mutual engagement only when the temperature difference between said first and second spaced apart portions of said heater means exceeds a predetermined level, said temperature difference resulting from a difference in rates of heat transfer of said heat conductive member and said tip member, the improvement comprising:

providing said tip member with a first portion of a substantially thermally conductive material and a second portion of a substantially thermally insulative material.

2. The improvement according to claim 1 wherein said first portion of said tip member is adapted for being in heat conductive relationship to said second portion of said heater means and said second portion of said tip member is adapted for being secured to said housing member.

3. The improvement according to claim 1 including an electrically conductive member adapted for providing an electrical interconnection between said first portion of said tip member and said housing member.

4. The improvement according to claim 1 wherein said material for said first portion of said tip member has a coefficient of heat transfer greater than about 20 BTU/(hr) (ft$^2$)(°F per ft) at 32°F.

5. The improvement according to claim 1 wherein said material for said second portion of said tip member has a coefficient of heat transfer less than about 10 BTU/(hr)(ft$^2$) (°F per ft) at 32°F.

6. The improvement according to claim 4 wherein said substantially thermally conductive material of said first portion of said tip member is copper.

7. The improvement according to claim 5 wherein said substantially thermally insulative material of said second portion of said tip member is plastic.

8. The improvement according to claim 3 wherein the material for said electrically conductive member consists essentially of about 29 percent by weight nickel, 17 percent by weight cobalt, and the remainder iron.

* * * * *